United States Patent
Djafer et al.

[11] Patent Number: 5,965,096
[45] Date of Patent: *Oct. 12, 1999

[54] PROCESS AND INSTALLATION FOR THE TREATMENT OF EFFLUENTS BY OXIDATION IN THE PRESENCE OF A HETEROGENEOUS CATALYST

[75] Inventors: Malik Djafer, Boulogne Billancourt; Francis Luck, Noisy le Grand; Jacques Sibony, Paris, all of France

[73] Assignee: Omnium deTraitements et deValorisation, Saint Maurice Cedex, France

[*] Notice: This patent is subject to a terminal disclaimer.

[21] Appl. No.: 08/913,279
[22] PCT Filed: Mar. 15, 1996
[86] PCT No.: PCT/FR96/00403
§ 371 Date: Sep. 10, 1997
§ 102(e) Date: Sep. 10, 1997
[87] PCT Pub. No.: WO96/29289
PCT Pub. Date: Sep. 26, 1996

[30] Foreign Application Priority Data

Mar. 17, 1996 [FR] France .................................. 95 03383

[51] Int. Cl.⁶ .......................... B01D 47/00; C01C 11/00; C02F 1/68
[52] U.S. Cl. .......................... 423/210; 423/659; 210/762
[58] Field of Search .......................... 210/762; 423/210, 423/659

[56] References Cited

U.S. PATENT DOCUMENTS 3,988,259 10/1976 Ray .
4,052,302 10/1977 Fletcher et al. ........................ 210/63 R
4,141,828 2/1979 Okada et al. .......................... 210/63 R
4,525,283 6/1985 Horak et al. ............................ 210/762
4,699,720 10/1987 Harada et al. .......................... 210/762
5,234,584 8/1993 Birbara et al. .

FOREIGN PATENT DOCUMENTS

0431932A1 of 1990 European Pat. Off. .
WOA9525698 of 1995 WIPO .
WOA9613463 of 1996 WIPO .

Primary Examiner—Gary P. Straub
Assistant Examiner—Eileen E. Nave
Attorney, Agent, or Firm—Coats & Bennett, P.L.L.C.

[57] ABSTRACT

A process of aqueous phase oxidation of effluents, consisting of subjecting the effluents to oxidation in the presence of at least one oxidizing agent inside a reactor having a gaseous phase set up above a liquid phase consisting of the effluents, and subjecting the gaseous phase to catalysis in the presence of at least one heterogeneous catalyst. The oxidation process is carried out at a temperature of between approximately 20° C. and approximately 350° C. under a pressure of between approximately 1 and 160 bars. At least a part of the organic matter and total ammoniated nitrogen contained in the effluents are mineralized. The process includes recycling at least a part of the gaseous phase present in the oxidation reactor after the gaseous phase has passed through the heterogeneous catalyst so as to effectively increase the contact time between the gaseous phase and the heterogeneous catalyst in order to obtain substantial removal of $NH_3$, COR, and volatile organic compounds.

25 Claims, 7 Drawing Sheets

PROCESS AND INSTALLATION FOR THE TREATMENT OF EFFLUENTS BY OXIDATION IN THE PRESENCE OF A HETEROGENEOUS CATALYST

The area of the invention is the treatment of industrial or urban effluents containing organic matter and nitrogen compounds.

More generally the invention relates to the treatment of effluents which contain organic matter and organic and inorganic compounds of nitrogen, such as waste lixiviation products, farm excrements, chemical industry effluents (dyes, explosives, anilines, nicotinic acid, polyamides etc.) effluents of agro-food industries, treatment plant sludge, output effluents from treatment sludge packaging and dehydration etc..

The treatment concerned consists of removing from the effluents to be treated a substantial part of the undesired compounds they contain so that they can be discharged into a natural receiving environment, a treatment facility or a collector network. The effluent considered may be water or any other fluid liquid.

The methods conventionally used to treat urban or industrial effluents use biological processes intended to reduce their biological oxygen requirements (BOR) and their content of nitrogenous nutrients and phosphorus. However, certain effluents containing pollutants that are not easily biodegradable and have high ammonia contents require the use of special processes and/or necessitate the additional use of chemical substrates for their treatment.

One effective treatment adapted to the elimination of chemical oxygen requirements (COR) is aqueous phase oxidation which has been described at length in the prior art. The objective of this technique is to carry out extended oxidation of organic matter that is little biodegradable contained in aqueous effluents through the contact of said effluents with an oxidising agent. For this purpose the operating conditions of said process typically lie between approximately 20 and approximately 350° C. regarding temperature and between approximately 1 and approximately 160 bars in respect of pressure.

Aqueous phase oxidation processes do not allow substantial elimination of ammoniated nitrogen, particularly when the effluents to be treated contain high concentrations of ammoniated nitrogen (>200 mg/l). Even oxidation under wet conditions (Wet Air Oxidation) which is one of the best performing oxidation processes, generally carried out at a temperature of between approximately 200° C. and approximately 350° C. and a pressure generally lying between approximately 20 and approximately 160 bars, only achieves limited removal of ammoniated nitrogen with yields of 5% to 10% whereas organic carbon is destroyed with efficacy in the region of almost 80%. Numerous publications have shown that the treatment of industrial or urban effluents by wet air oxidation only achieves very partial elimination of total Kjeldahl nitrogen of between 5 and 15% and that on completion of treatment the latter is essentially in ammoniated nitrogen form.

Physical processes also exist for the removal of ammoniated nitrogen. Air or steam stripping, effective for high contents, requires considerable investment and is ill-adapted to the treatment of effluents which also contain high concentrations of organic matter. Also, it only achieves ammonia conversion by concentrating it. With this type of process the ammonia is removed by neutralisation with sulphuric acid to form ammonium sulphate which has to be stored before being put to further use, which constitutes an additional operating charge. With treatment by wet air oxidation for example this operation can only be carried out after leaving the effluent to settle, cooling to a temperature of less than 80° C. and adjusting pH in order to prevent simultaneous release of volatile, foul smelling and/or harmful organic compounds during forced aeration at a higher temperature. This treatment of ammoniated nitrogen subsequent to wet air oxidation leads to much increased investment and operating costs.

In treatment plants the removal of ammoniated nitrogen may also be made by biological nitrification-denitrification treatment. This treatment does not easily accept high loads.

If the effluent has sufficiently high COR content it is possible to carry out simultaneous removal of organic matter and of organic and inorganic nitrogen compounds by incineration. This technique leads to the formation however of a large quantity of NOx nitrogen oxides (x=1 and 2), by oxidation of a substantial part of the nitrogenous load. In order to comply with NOx release standards therefore, it is necessary to treat incineration fumes, in particular by catalytic reduction of NOx by NH3, a technique which is expensive to set in operation.

It is also possible to reinforce the efficacy of wet air oxidation for the removal of ammoniated nitrogen through the use of heterogeneous catalysts in contact with the effluent to be treated, made up for example of titanium dioxide, a rare earth oxide and a precious metal oxide such as described in European Patent EP-A43 1 932, or in American Patent U.S. Pat. No. 3,988,259. However, such catalysts have the disadvantage of showing substantial loss of activity with time due to the fact that they are immersed during use. A further disadvantage of catalytic wet air oxidation arises from the fact that the heterogeneous catalyst may be affected by the precipitation in its structure of calcium carbonates and sulphates and of metals present in traces in the effluents such as mercury, cadmium, lead, zinc etc. which are known poisons for numerous catalysts by acting to form combinations or alloys in particular with precious metals. All these disadvantages mean that the process of wet air oxidation is not currently used to treat effluents.

It will also be noted that as no catalysts are used for processes such as wet air oxidation for example, this leads to gaseous ammonia being carried by treatment gases which causes the formation of ammonium salt deposits such as ammonium sulphate, ammonium acetate etc. These deposits may lead to fouling of essential parts such as conduits and valves.

The purpose of this invention is to provide a process for the oxidation of effluents in aqueous phase which will remedy the disadvantages of the current state of the art. More precisely, the purpose of the present invention is to provide a process for treating industrial or urban effluents containing organic matter and organic and inorganic nitrogen compounds which achieves substantial removal of total ammoniated nitrogen and simultaneously achieves a substantial decrease in the COR of said effluents and in the release of harmful or foul smelling gases.

A further objective of the invention is to provide a process and installation which allows disadvantage-free use of heterogeneous catalysts for wet air oxidation processes.

Yet another objective of this invention is to describe a process which will substantially increase the life of such heterogeneous catalysts.

A further objective of the invention is to improve the efficacy of aqueous phase oxidation processes and to reduce the costs incurred for their implementation.

Whereas French patent application n° 9413100 of Oct. 27th 1994 (filed before the anteriority date of the present international application but only published after this date,) recommended, in order to achieve these objectives, placing the heterogeneous catalyst actually inside the aqueous phase oxidation reactor above the interface between the gas phase and the liquid phase, subsequent research work highlighted that these different objectives could be achieved whether the catalyst was placed inside the reactor or outside the reactor on the outlet pipe for discharging the gaseous phase but making provision for a recycling stage of at least part of the gaseous phase present in the oxidation reactor.

The invention claimed in the present application therefore relates to a process of aqueous phase oxidation of effluents consisting of subjecting said effluents to oxidation in the presence of at least one oxidising agent inside a reactor in which a gaseous phase is set up above the liquid phase made up of the effluents, and of subjecting said gaseous phase to catalysis in the presence of at least one heterogeneous catalyst, said process being carried out at a temperature of between approximately 20° C. and approximately 350° C. under a total pressure of between approximately 1 and approximately 160 bars, in such manner as to mineralise at least part of the organic matter and total ammoniated nitrogen contained in said effluents characterized in that it comprises a stage consisting of recycling at least part of said gaseous phase present in said oxidation reactor after transiting through said heterogeneous catalyst, in such manner as to ensure sufficient contact time with said effluents in order to obtain substantial removal of NH3, COR and volatile organic compounds.

It will be understood that according to the new aspect of the invention, the catalyst may be placed outside the core of the reactor on the recycling pipe of said gaseous phase.

However, according to a variant of interest of this invention, said heterogeneous catalyst is placed inside said reactor above the interface between said gaseous phase and said liquid phase, as described and claimed in French patent application n° 9413100.

With said process it is possible to achieve removal of total ammoniated nitrogen by oxidation into $N_2$ molecular nitrogen without forming NOx nitrogen oxides(x=1 or 2).

The catalyst used in this way is also able to achieve simultaneous removal of the carbon monoxide CO usually formed during wet air oxidation through oxidation into carbon dioxide, and the removal of volatile organic compounds by oxidation into carbon dioxide and water.

It was found, in surprising manner, that such positioning of the catalysts inside the reactor allowed the removal with great efficacy of both ammoniated nitrogen and CO which in turn allowed release of the residual gas into the atmosphere with no complex subsequent treatment. In unexpected manner, the transfer of ammoniated nitrogen to the gaseous phase of the reactor, as far as the catalysts in view of oxidation, is sufficiently efficient to avoid having to proceed with pH adjustment to higher levels as is the case with forced aeration.

The position of the heterogeneous catalyst above the interface between the gaseous and liquid phases in the oxidation reactor also avoids the use of costly catalysts able to resist against the corrosive conditions of the liquid phase, and also avoids any risk of particle fouling of the catalyst and any risk of loss of activity of the catalysts by dissolution of its active phase or by reaction with contaminants present in the liquid phase.

According to a variant of interest of this invention, the process is set in operation at a temperature of between approximately 200° C. and 350° C. under a total pressure of between approximately 20 and approximately 160 bars. It therefore constitutes a process of wet air oxidation.

Preferably, said heterogeneous catalyst is a metal belonging to the group made up of vanadium, niobium, chromium, molybdenum, tungsten, manganese, iron, cobalt, nickel, copper, cerium, platinum, rhodium, palladium, ruthenium and iridium and the mixtures and compounds of one or more of these.

The catalyst may advantageously be placed on a mineral support made up for example of an oxide such as alumina, silica, zeolites, titanium dioxide, zirconium etc.

The catalysts may be prepared by any other means known to men of the art, in particular by impregnation of a porous support with a solution of one or more compounds of metals producing metals or metallic oxides by heat activation, or by a mixture of an oxide support and one or more metal compounds then given form by extrusion, pelleting, granulation, compressing etc.

The catalyst of the invention may be in the form of beads, chips, cylindrical or polylobate extrudates, rings, ceramic or metallic honeycombs, or any other form appropriate for setting up a fixed catalyst bed placed in the wet air oxidation reactor above the interface between the gaseous and liquid phases. Preferably, metallic honeycombs are used as they have the combined advantages of being cheap, easy to use, easy to lock into position inside the reactor and easy to move inside the reactor.

As specified above, oxidation in aqueous phase is carried out in a reactor operating continuously or intermittently at a temperature of between approximately 20° C. and approximately 350° C. under a total pressure lying between approximately 1 bar and 160 bars. To perform said oxidation at least one oxidising agent is used chosen from among air, oxygen enriched air, oxygen, ozone, hydrogen peroxide, peracids, gaseous chlorine, chlorine bioxide, sodium hypochlorite, potassium permanganate or any other oxidising agent known to men of the art.

If the oxidising agent used is placed in the treatment reactor in liquid or solution form, as for example hydrogen peroxide, sodium hypochlorite, potassium permanganate etc . . . the invention preferably comprises a gas flow into the reactor made up of at least one agent chosen from among air, oxygen enriched air, oxygen, ozone, water or nitrogen steam.

Catalytic oxidation is carried out at a temperature of between approximately 200° C. and approximately 350° C., preferably between 250° C. and 300° C. When setting in operation a process of wet air oxidation, positioning of the catalyst inside the reactor, owing to the temperature prevailing inside said wet air oxidation reactor (between 200° C. and 350° C.) proves to be highly effective in carrying out oxidation reactions of $NH_3$ into $N_2$ and $N_2O$, of CO into $CO_2$ and of volatile organic compounds into $CO_2$ and $H_2O$ without the need to heat the gases as in the case of treating said gases in an additional reactor located outside the wet air oxidation reactor. Also, since the different oxidation reactions catalysed in this way are highly exothermic, the heat emitted by said reactions is for the most part transmitted by radiation, conduction and convection to the entire reactor which improves its thermal output and in particular enables treatment of more diluted effluents containing less COR without the need to supply additional calories to balance the overall thermal output of the oxidation process. according to a variant of interest of this invention, this catalytic oxidation temperature may be higher than the oxidation temperature in aqueous phase. It will then be possible not to bring the entire inside of the reactor up to catalytic oxidation temperature but only the area in which this catalytic oxidation takes place, which means that lower pressures can be used for oxidation in aqueous phase. To set in operation said variant of the invention, specific heating means are used to heat the catalytic oxidation area, which are placed at the same level as the area of the reactor in which the heterogeneous catalyst is positioned. These means may in particular be made up of a heating collar placed on the outside surface of the reactor. The catalytic oxidation area may also be heated using the Joule effect. Heating the catalytic oxidation area to a temperature that is higher than that of the liquid effluent also has the advantage of avoiding any condensation of said effluent.

According to a variant of the process, said oxidation in aqueous phase may be carried out in the presence of a homogeneous catalyst intended to increase the efficacy of COR reduction. According to said variant, oxidation is therefore carried out in the presence of two catalysts, a heterogeneous catalyst placed above the interface between the gaseous phase and the liquid phase, and a homogeneous catalyst.

Preferably, said catalyst is a metal belonging to the group made up of manganese, iron, cobalt, nickel, copper, zinc and the mixtures and compounds of one or more of these. In particularly advantageous manner, a soluble compound of copper is used (such as copper sulphate) or of zinc or their mixture, the mass ratio of catalyst metal/chemical oxygen requirements (COR) of the effluent before treatment lying preferably between approximately $5.10^{-4}$ and $3.10^{-1}$.

It will also be noted that another catalyst may be used at the exit of the reactor, for example for additional treatment of the carbon oxide and of volatile organic compounds.

According to a further variant of the process, the treated effluent comprises an additional stage of recycling part of said liquid phase present in the oxidation reactor. With said stage it is possible to further increase the contact time between the liquid phase and the gas phase to allow oxidation of the organic matter in said effluent.

Also according to a variant of interest of this invention, the process comprises a stage consisting of adjusting the pH of said effluents to a value of 7 to 12. It was observed that said adjustment increased the efficacy of catalytic oxidation of ammonia without increasing the formation of nitrogen oxides.

The invention relates to any reactor for aqueous phase oxidation of a liquid effluent by an oxidising agent in order to set in operation the above-described process, in which a gaseous phase is set up above the liquid phase made up of the effluents, characterized in that it comprises means of recycling said gaseous phase.

Preferably said reactor also includes means of holding a heterogeneous catalyst above the surface of said liquid effluent.

Also preferably, said reactor includes means adjusting the position of said holding means, in such manner as to be able to adjust the height between the catalyst and the surface of the liquid effluent inside the reactor. This height may vary in relation to the type of effluent to be treated, particularly in relation to whether or not stirring means are provided within the reactor.

According to a variant the reactor comprises a devesiculator between the liquid phase and the catalyst.

According to a variant of interest, the reactor also comprises means of recycling the liquid phase.

Preferably said means of recycling the gas phase includes means of aspirating this gaseous phase after its passage on the catalyst and of mixing it with the recycled liquid phase.

Such means may, for example, be made up of a hydroejector. The use of said means will increase ammonia stripping and therefore oxidation by catalysis. Also, it provides for better use of the injected oxygen, since the recirculated gaseous phase still contains a high quantity of oxygen. Therefore, such means allows mprovement of the gas/liquid transfer and therefore an increase in the efficacy of the oxidation reaction.

As will be explained in more detail in the examples of embodiment described below, it is particularly advantageous to use said hydroejector while continually adjusting the pH of the treated effluent. It was observed that such treatment achieved a decrease in the ammoiated nitrogen content of the treated effluent. This constitutes a further advantage of the process of the invention since Wet Air Oxidation processes traditionally have the disadvantage of producing treated effluent having an increased ammoniated nitrogen content.

The invention and the different advantages it offers will more clearly understood on reading the description of the five examples of embodiment (examples 2 to 6) given below with reference to a comparative example which does not use the characteristics of the invention (example 1) and with reference to the drawings in which.

EXAMPLE 1

Not Representative of the Invention

Figure 1:
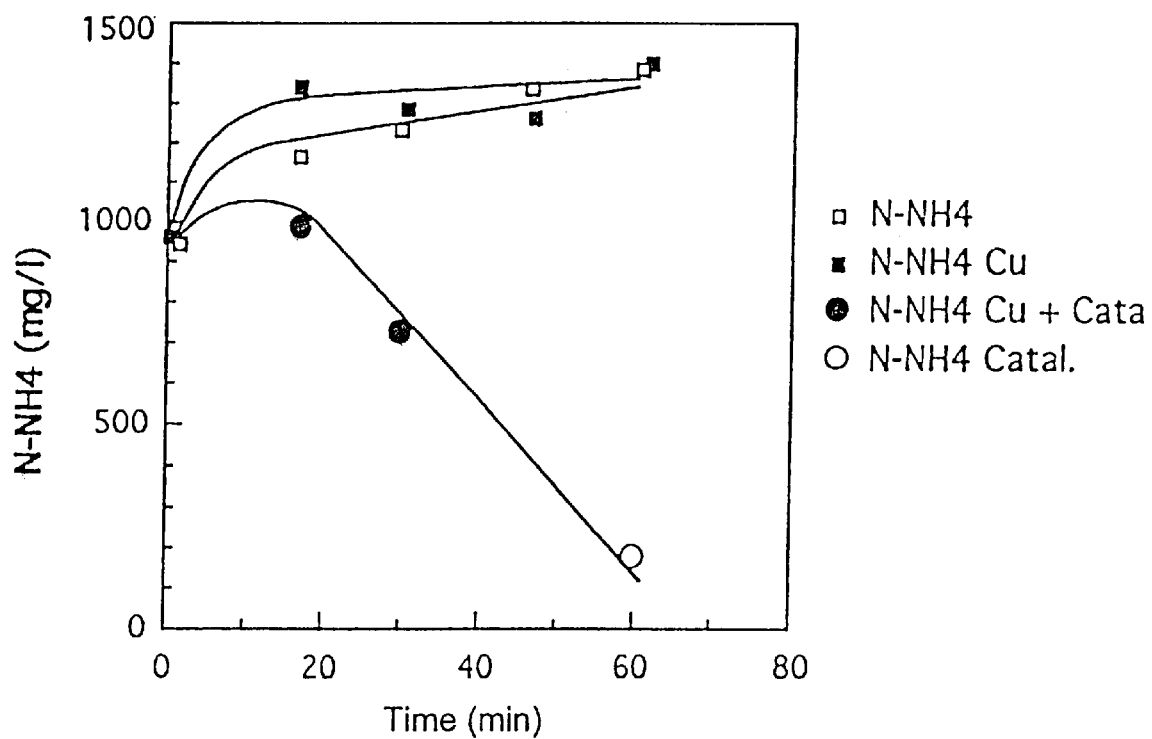
FIG. 1 represents the formation and reduction of ammoniated nitrogen in relation to treatment time, to the presence of a homogeneous catalyst (Cu) and a heterogeneous catalyst (Pt catalyst) at 235° C. and 38 bars.

In a first series of tests, wet air oxidation is examined of a liquid effluent having the following characteristics:

COR: 34.6 g/l

N-NH4 content: 1,89 g/l pH: 5.41

This effluent is placed in an autoclave reactor in the presence of an oxygen/COR stoichiometry of 1.5, at a temperature of 235° C. and under a total pressure of 46 bars with a reaction time of 10 min. For comparison with a test without heterogeneous catalyst, catalysts containing precious metals are placed inside the autoclave on an alumina support in cylindrical drop form (2.8 mm×3.5 mm) comprising respectively 0.5% ruthenium (615 mg of type 146 catalyst produced by Johnson Matthey), 0.5% platinum (610 mg of type 73 catalyst produced by Johnson Matthey) and 5% palladium (110 mg of type 49 catalyst produced by Johnson Matthey).

The following COR and N-NH4 values were noted at the end of the test.

|              | Without catalyst | 0.5% Ru | 0.5% Pt | 5% Pd  |
|--------------|------------------|---------|---------|--------|
| COR (g/l)    | 31.9             | 31.0    | 28.0    | 30.3   |
| COR red. (%) | 7.8              | 10.4    | 19.0    | 12.4   |
| N-NH4 (g/l)  | 2.28             | 2.10    | 1.67    | 2.33   |
| N-NH4 red (%)| −17.3            | −11.3   | −11.3   | −23.6  |

It is observed that the presence of Ru and Pd based catalysts does not significantly alter reductions of COR and ammoniated nitrogen. On the other hand, the Pt based catalyst leads to a COR reduction of 19% and removal by oxidation of 11% of ammoniated nitrogen. However, after a reaction time of 10 min, all the catalysts used lost most of their precious metal content through suspension in the solution further to shock and friction due to stirring of the effluent in the reactor required for reaction purposes. Although it shows some efficacy in removing ammonia, the platinum based heterogeneous catalyst placed in the liquid effluent to be treated does not show sufficient long-lasting properties for industrial use.

EXAMPLE 2

In a second series of tests wet air oxidation of sludge from a treatment plant with the following characteristics was examined:

matter in suspension : 40.7 g/l volatile matter: 60.7%

COR: 48.7 g/l

N-NH4 content: 0.938 g/l pH: 6.3

Figure 4:
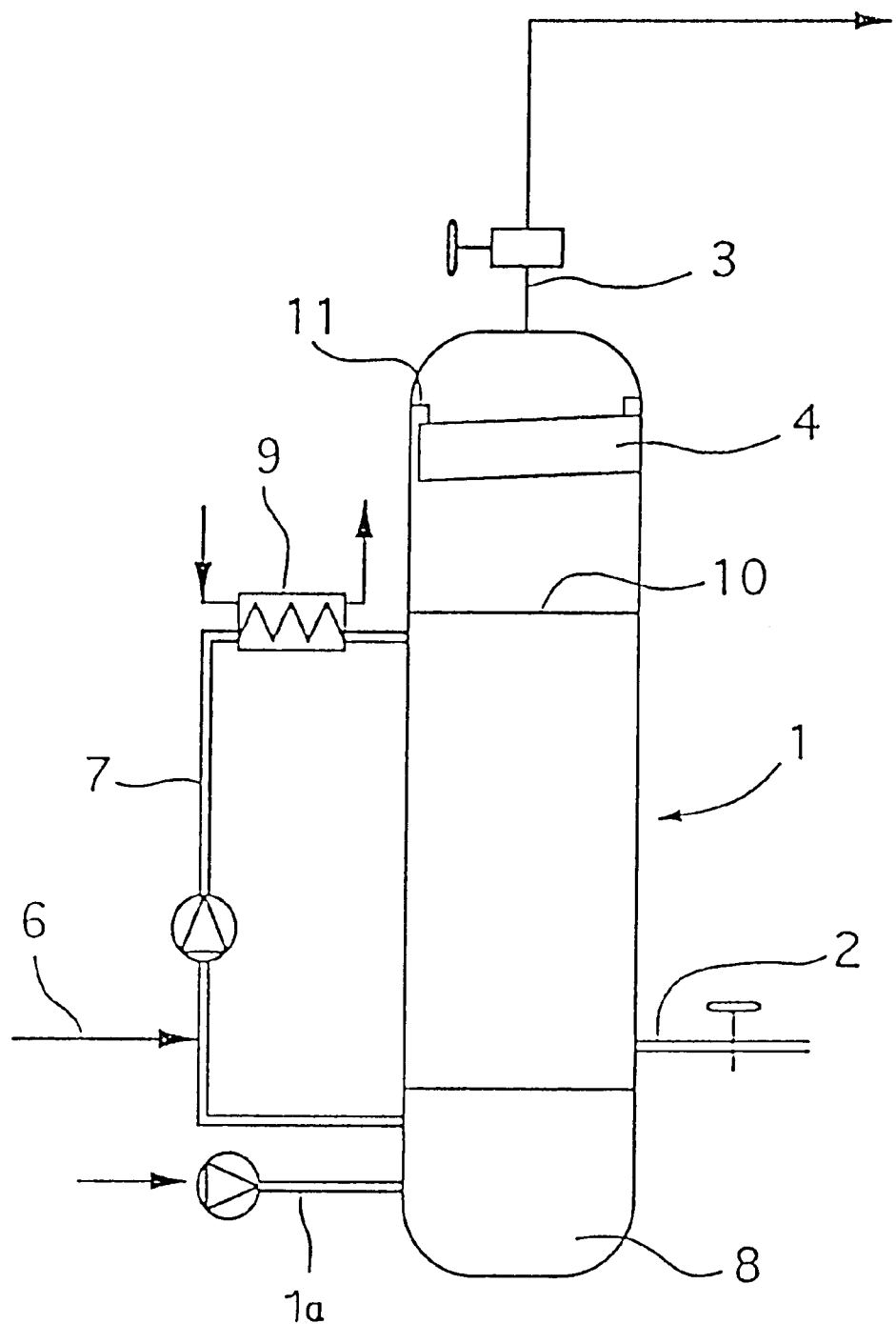
FIG. 4 represents a first embodiment of a reactor in accordance with patent application n° 9413100 which does not include means of recycling the gaseous phase.

This sludge is placed in a wet air oxidation reactor according to the present invention as shown in FIG. 4.

The reactor is supplied with effluent to be treated by injection pipe 1a. This reactor is fitted with heating means able to bring the effluent to a temperature lying between approximately 100° C. and 350° C. Pressurising means are provided to bring the effluents to be treated in the reactor under a pressure of between approximately 5 bars and approximately 160 bars.

In conventional manner, the reactor is fitted with two pipes 2 and 3:

an outlet pipe 3 to discharge a water saturated gaseous phase, essentially containing oxygen, an outlet pipe 2 to discharge an essentially liquid phase chiefly containing residual soluble organic matter and an essentially mineral solid phase in suspension.

The injection of oxygen 6 is made by a sludge recirculation loop 7 from base 8 of reactor 1 towards its upper part. This layout is advantageous but not compulsory. It is also possible to inject oxygen into another part of the reactor. A heat exchanger 9 is provided to recover and return the calories from treated effluents with a view for further use, for example, to preheat the effluent to be treated.

In accordance with the essential characteristic of the invention, a heterogeneous catalyst is placed in a basket container 4 above interface 10 between the liquid phase and the gas phase present in the reactor in such manner as to leave between said interface 10 and said catalyst a security volume which will prevent or at least minimise contact of said effluent with said catalyst. This security volume is obtained by maintaining sufficient partial pressure above the liquid while maintaining the latter at a given level. Means 11 made up of notches on the inner wall of the reactor are provided to change the position of said basket container. A heater 12 may be positioned proximate the heterogeneous catalyst's basket container 4 to heat the heterogeneous catalyst, preferably to temperature substantially above the temperature of the effluent.

Under the present example, the sludge is placed in this reactor under an oxygen/COR stoichiometry of 1.5, at a temperature of 235° C. and under a total pressure of 38 bars. For comparison with tests without a heterogeneous catalyst, a heterogeneous catalyst in accordance with the present invention is placed in the autoclave. The catalyst used is a catalyst containing 0.5% platinum on an alumina support in the form of cylindrical drops (2.8 mm×3.5 mm, type 73 catalyst produced by Johnson Matthey) contained in a grid basket container placed horizontally approximately 30 cm above the liquid-gas interface at rest (no stirring).

Certain tests were carried out by adding to the sludge to be treated a homogenous catalyst (copper sulphate with a copper content of 500 mg/l), a catalyst intended to accelerate COR reduction.

The results given in FIG. 1 show that the homogeneous copper catalyst used alone (with no platinum based heterogeneous catalyst) only accelerates the conversion kinetics of organic nitrogen (amino acids, peptides, proteins . . . ) into ammoniated nitrogen but does not contribute to removing ammoniated nitrogen by oxidation compared with a test without copper. On the contrary, the 3 tests carried out in the presence of the platinum catalyst show substantial reduction of ammoniated nitrogen of up to 86% after a reaction time of 1 hour.

Figure 2:
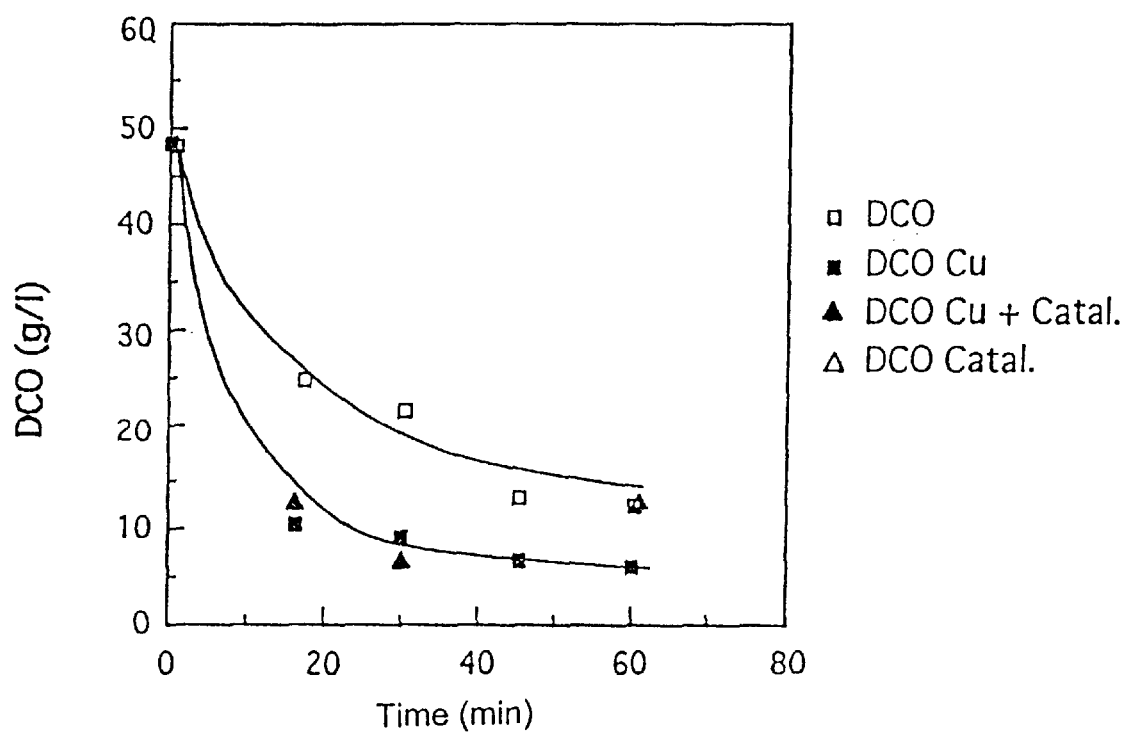
FIG. 2 represents COR reduction in relation to time and to the presence of a homogeneous catalyst (copper) and a heterogeneous catalyst (platinum)

It is observed from the results given in FIG. 2 that the presence of the platinum catalyst does not in any way affect COR removal during the wet air oxidation reaction. Unlike the prior art, and in particular the disclosures of EP patent 431 932, according to which the presence of a heterogeneous catalyst, for example containing platinum, in contact with the effluent increases the removal rate of COR and ammoniated nitrogen, the use of the heterogeneous catalysts of the invention leads to extended nitrogen removal without affecting COR decline in any way.

It is therefore possible for example in the case of a residual water treatment plant, by using wet air oxidation treatment, to remove total ammoniated nitrogen from sludge and to produce an effluent made up chiefly of volatile fatty acids, alcohols and ketones, said effluent forming a very efficient carbonated source to remove the nitrogen contained in the effluent entering the plant by biological denitrification.

EXAMPLE 3

In a third series of tests, wet air oxidation of sludge from a treatment plant is examined, the sludge having the following characteristics:

matter in suspension: 40.7 g/l volatile matter: 60.7%

COR: 48.7 g/l

N-NNH4 content: 0.938 g/l pH: 6.3

This sludge is placed in the reactor described in FIG. 4 in the presence of an oxygen/COR stoichiometry of 1.5, at a temperature of 235° C. and under a total pressure of 38 bars, with a reaction time of 15 min. For comparison with tests with no heterogeneous catalyst, the same load of catalyst containing 0.5% platinum as used for the second series of tests is placed in the autoclave in a grid basket container positioned either horizontally approximately 30 cm above the liquid-gas interface at rest (test H3) or vertically approximately 80 cm above the liquid-gas interface at rest (test V8). Certain tests are carried out by adding to the sludge to be treated a homogeneous catalyst (copper sulphate, with a copper content of 500 mg/l)) a catalyst intended to accelerate COR decrease. Optionally the initial pH of the sludge (6.3) is adjusted to a value of 10 by adding a soda solution.

The results in Table 1 show that the increase of the initial pH of the sludge increases the catalytic oxidation efficacy of ammonia and that there is no significant formation of NOx nitrogen oxides, which would become soluble in the effluent treated in the form of $NO_2^-$ nitrite and $NO_3^-$ nitrate ions.

TABLE I

| Catalysts | Initial pH | Final pH | Contact time (min) | N-NH4 (mg/l) | N-N02 (mg/l) | N-NO3 (mg/l) |
|---|---|---|---|---|---|---|
| — | 6.3 | 7.660 | 0 | 1407 | 12 | n.d. |
| Pt(H3) | 6.3 | 4.560 | 15 | 189 | 15 | 0.2 |
| Pt(H3) | 6.3 | 5.860 | 15 | 126 | 25 | 0.7 |
| Cu | 6.3 | 6.515 | 15 | 1361 | 4.5 | n.d. |
| Cu, Pt (V8) | 6.3 | 6.115 | 15 | 867 | 9 | 0.4 |
| Cu, Pt (V8) | 10.0 | 6.815 | 15 | 696 | 8 | 0.3 | n.d.: not determined

EXAMPLE 4

In a fourth series of tests wet air oxidation of an effluent derived from a thermal sludge packaging process is examined which has the following characteristics:

COR: 9.4 g/l

N-NH4 content: 1.52 g/l pH: 7.85

This effluent is placed in an autoclave reactor in the presence of an oxygen/CIR stoichiometry of 1.5, at a temperature of 235° C. under a total pressure of 35 bars with a reaction time of 15 min/ For comparison with a test with no heterogeneous catalyst, the same load of catalyst containing 0.5% platinum already used for the second and third series of tests, is placed in the autoclave vertically approximately 80 cm above the liquid-gas interface at rest.

TABLE 2

| Catalysts | Initial pH | Final pH | Contact time (min) | N-NH4 (mg/l) | N-N02 (mg/l) | N-NO3 (mg/l) |
|---|---|---|---|---|---|---|
| — | 7.85 | 7.85 | 0 | 1521 | 323 | |
| Cu, Pt(H3) | 7.85 | 6.7 | 15 | 720 | 117 | |
| Cu, Pt(H3) | 10.0 | 7.6 | 15 | 600 | 116 | |

The results given in Table 2 confirm that the increase of the initial pH of the effluent from 7.85 to 10.0 increases the efficacy of the catalytic oxidation of ammonia and that there is no significant increase in the total oxidised forms of nitrogen, $NO_2$ nitrite and $NO_3$. nitrate in the effluent treated.

EXAMPLE 5

Figure 3:
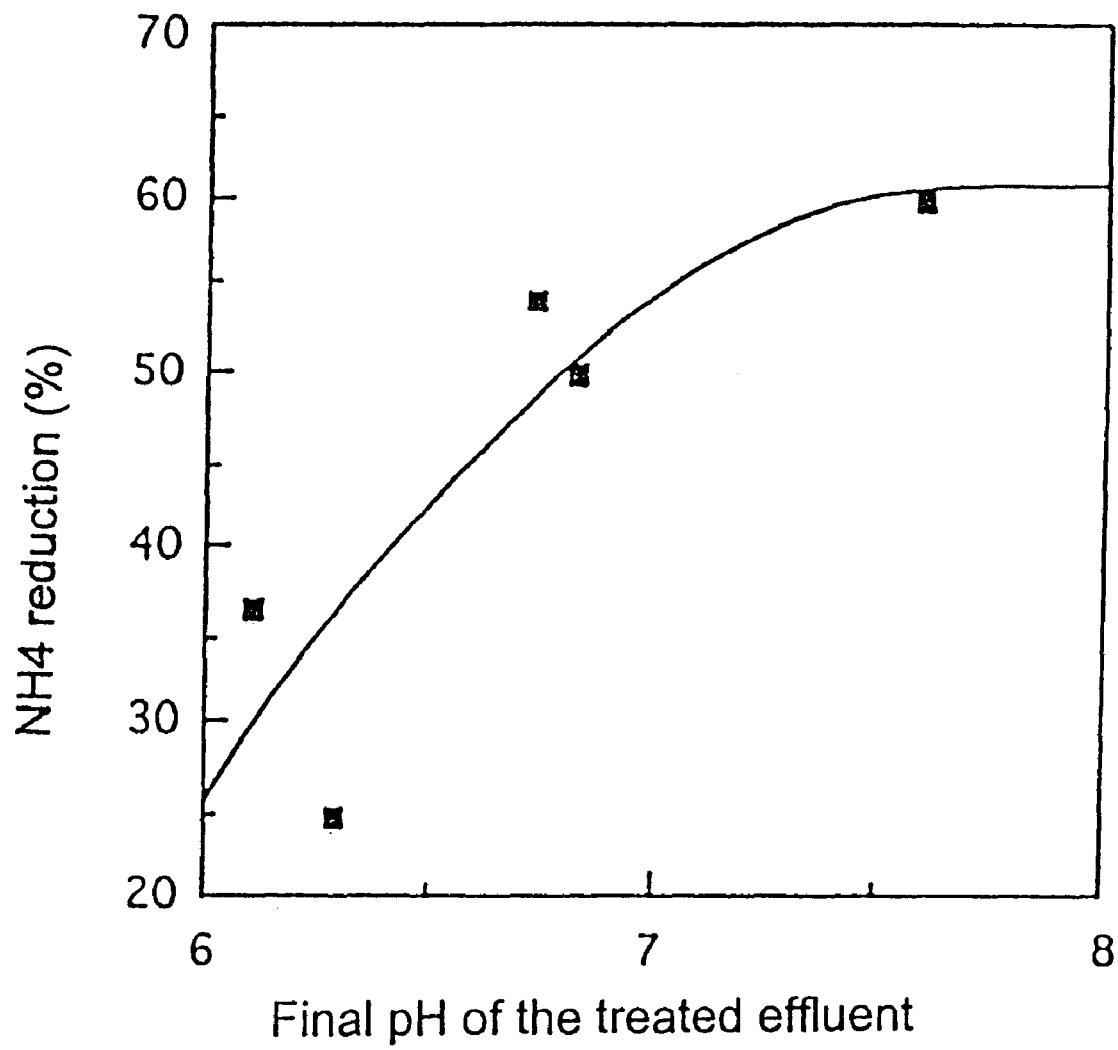
FIG. 3 represents the influence of the final pH of the treated effluent on the percentage of removal of ammoniated nitrogen.

FIG. 3 shows the effect of the final pH of the treated effluents on the percentage of removal of ammoniated nitrogen in the different tests made in the presence of an oxygen/COR stoichiometry of 1.5, at a temperature of 235° C. for 15 minutes under a total pressure of 38 bars in the presence of a homogeneous catalyst (copper sulphate with a copper content of 500 mg/l) and a catalyst load containing 0.5% platinum contained in a grid basket container placed either horizontally approximately 30 cm above the liquid-gas interface at rest (test H3) or vertically approximately 80 cm above the liquid gas interface at rest (V8). Optionally the initial pH of the effluent is adjusted to a value of 10 by adding a soda solution.

These results confirm that the removal of ammoniated nitrogen is helped by an increase in the effluent's pH;

EXAMPLE 6

In this test wet air oxidation of an effluent is examined which contains the following compounds:

Urea ($NH_2CONH_2$: 0.026 mol/l)

Hexamethylenetetramine or HTM ($C_6H_{12}N_4$): 0.036 mol/l)

COR: 7.6 g/l

This effluent is placed in a reactor in the presence of an oxygen/COR stoichiometry of 1.5 at a temperature of 285° C. under a total pressure of 86 bars with a reaction time of 10 min. For comparison with a test with no heterogeneous catalyst, a precious metal based catalyst is placed in the autoclave on an alumina support in cylindrical honeycomb shape comprising 0.5% platinum.

TABLE 3

| | Initial solution | Treatment with no catalyst | Treatment with catalyst |
|---|---|---|---|
| COR g/l | 7.6 | 0.4 | 0.03 |
| N-NO3 g/l | — | 0.008 | 0.075 |
| N-NO2 g/l | — | 0 | 0.04 |
| N-NH4 g/l | — | 2.76 | 0.045 |
| pH | 7.5 | 9 | 6 |

The results obtained (see Table 3) show that in the presence of a catalyst, the percentage of ammonia removal reaches 98% and that there is no significant increase in the total oxidised forms of nitrogen, $NO_{2-}$ nitrite and $NO_{3-}$ nitrate, in the treated effluent.

EXAMPLE 7

In this test, wet air oxidation of an effluent is tested which contains the following compounds:

Urea ($NH_2CONH_2$): 0.0335 mol/l

Amino4-benzenesulfonamide ($C_6H_8N_2O_2S$): 0.0697 mol/l

COR: 11.4 g/l pH: 6.8

This effluent is placed in an autoclave reactor in the presence of an oxygen/COR stoichiometry of 1.5, at a temperature of 285° C. under a total pressure of 86 bars with a reaction time of 10 min. For comparison with a test with no heterogeneous catalyst, a catalyst containing precious metals is placed in the autoclave on an alumina support in cylindrical honeycomb form comprising 0.5% platinum.

TABLE 4

| | Initial solution | Treatment with no catalyst | Treatment with catalyst |
|---|---|---|---|
| COR g/l | 11.4 | 0.5 | 0.24 |
| N-NO3 g/l | — | 0.002 | 0.010 |
| N-NO2 g/l | — | 0 | 0.010 |

TABLE 4-continued

|  | Initial solution | Treatment with no catalyst | Treatment with catalyst |
|---|---|---|---|
| N-NH4 g/l | — | 1.8 | 0.34 |
| pH | 6.8 | 8.3 | 2.1 |

The results obtained (Table 4) show that the presence of the catalyst allows ammonia to be removed with a yield of 81% and that there is no significant increase in the total oxidised forms of nitrogen, $NO_{2-}$ nitrite and $NO_{3-}$ nitrate, in the treated effluent.

EXAMPLE 7

Figure 6:
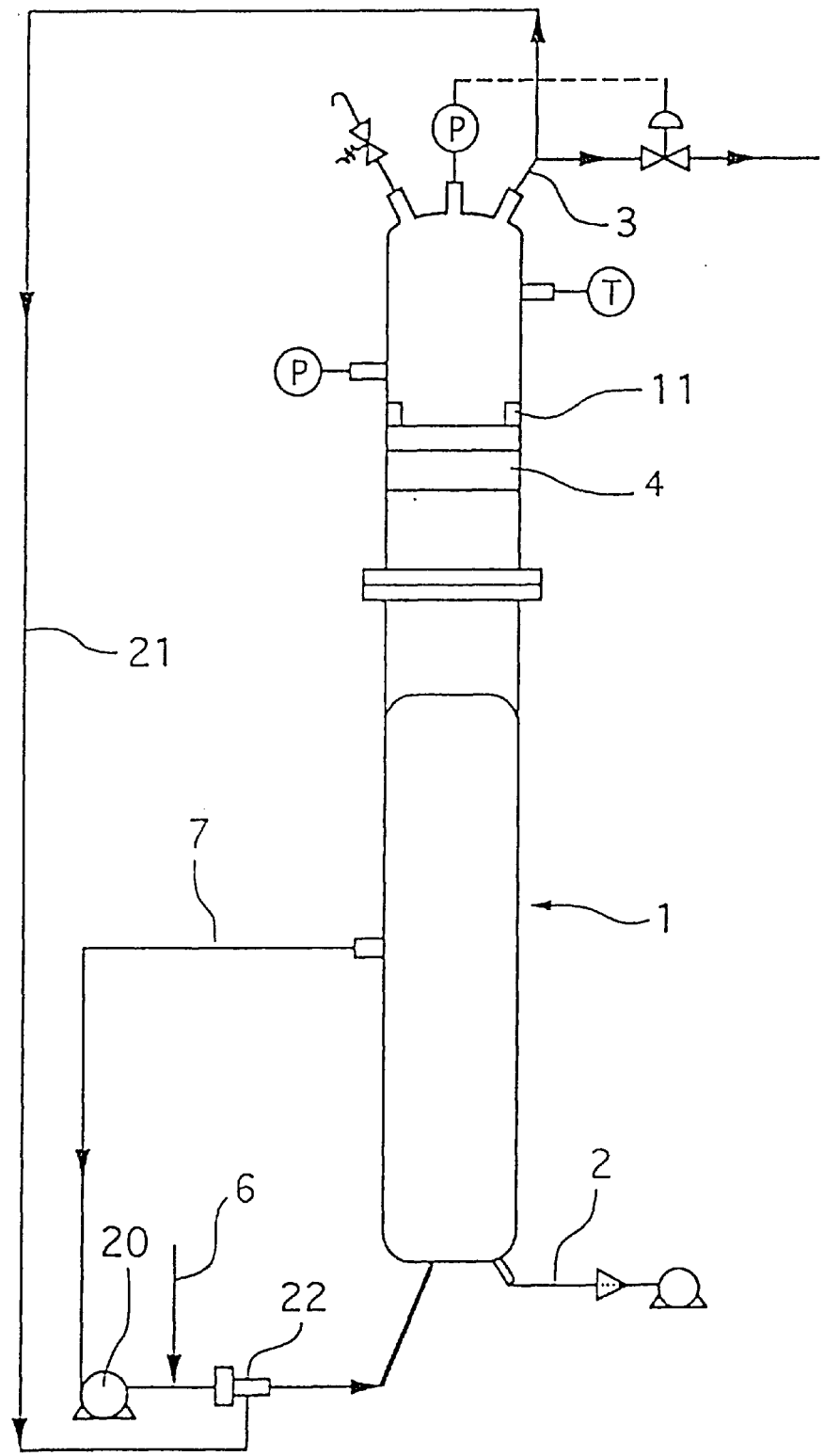
FIG. 6 represents an embodiment of a reactor in acordance with the present patent application integrating the means of recycling the gaseous phase.

In a third series of tests, a wet air oxidation reactor was used in accordance with the present invention as shown in FIG. 6.

Figure 5:
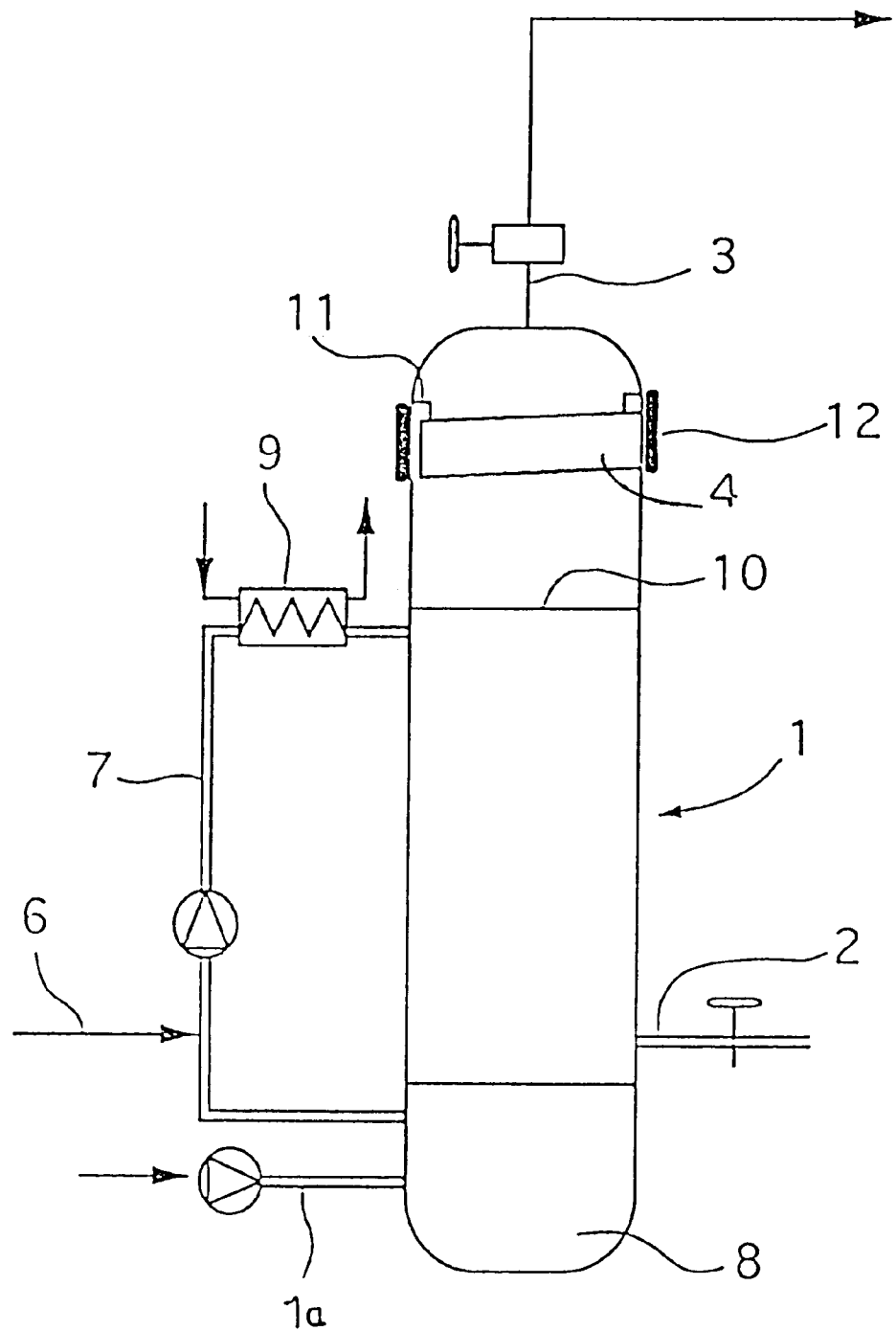
FIG. 5 represents a second embodiment of a reactor in accordance with the patent application No. 9413100 which does not include means of recycling the gaseous phase.

This reactor differs from the reactors shown in FIGS. 4 and 5 essentially by the fact that it includes means 21 of recycling the gaseous phase drawn off in the upper part of the reactor. These means also comprise a hydroejector 22 placed at the exit of pump 20 ensuring recirculation of the liquid phase (sludge) in the reactor through pipe 7. This element allows the hot gaseous phase to be aspirated after its passage through catalyst 4, to be mixed with the recirculated liquid phase and permits returning the mixture thus formed to the base of the reactor. Under the tests carried out with this reactor the aspiration flow of the gaseous phase with hydroejector 22 was set at 4 Nm3/h.

This reactor was tested on a sludge having the following characteristics:

COR: 7.2 g/l

N-NH4 content: 1850 g/l matter in suspension : 22.5 g/l pH: 6.3

The treatment led to obtaining a treated effluent having an ammoniated nitrogen content of 963 mg/l, i.e. a reduction of 42%, and a COR content of 887 mg/l, i.e. a reduction of 87%.

In comparison with treatment without a hydroejector, an improvement in COR reduction was observed (85% instead of 68%).

Other tests were carried out with continuous adjustment of the pH in order to maintain its value at approximately 7. This adjustment was made by the addition of soda.

These tests were carried out on a thickened sludge with an initial pH of 10 and a total nitrogen content of 1350 mg/l (NTK). They achieved a 80% reduction of COR and a 67% reduction of total nitrogen (NTK).

EXAMPLE 8

Figure 7:
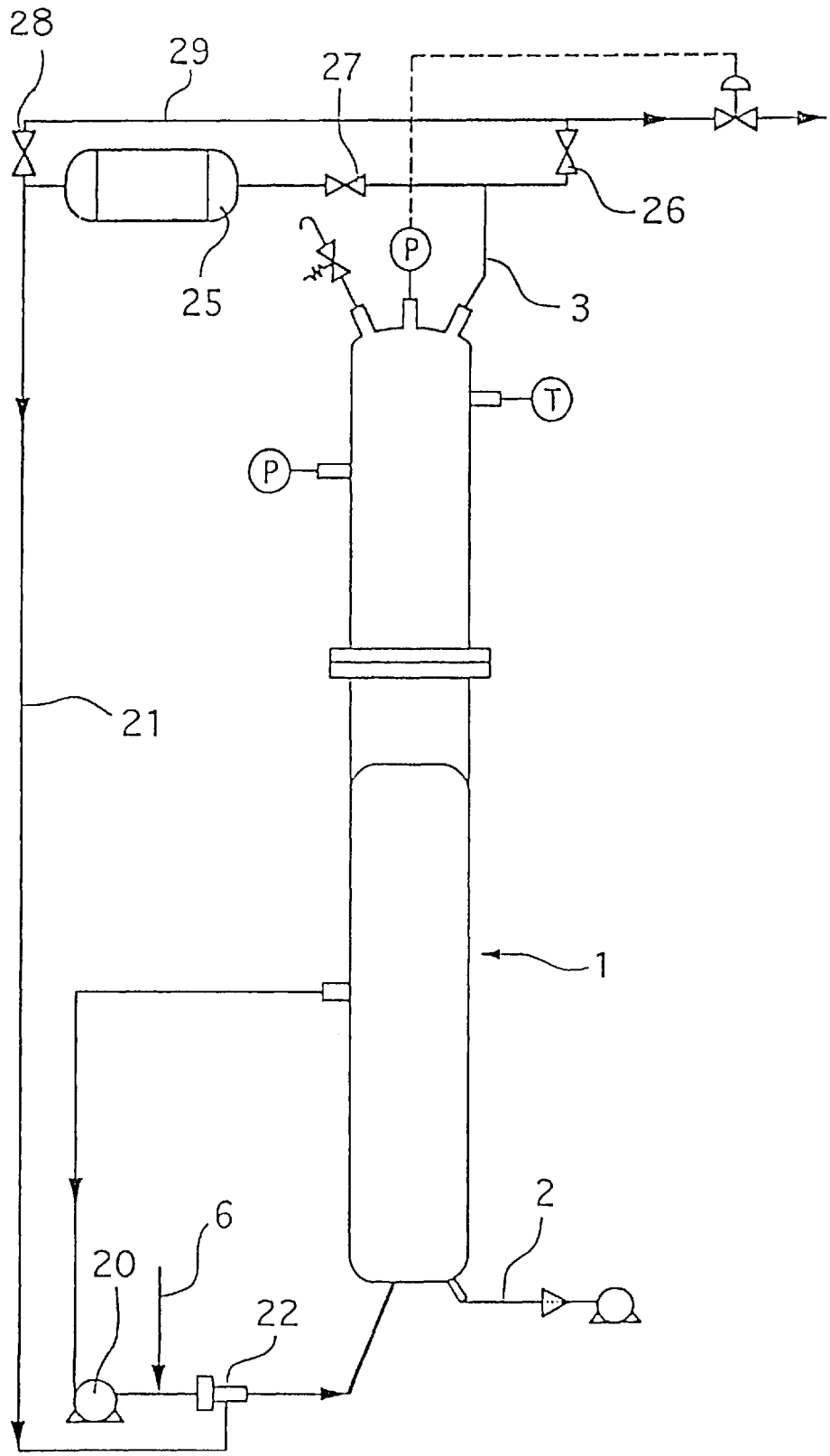
FIG. 7 represents a further embodiment of a reactor in accordance with the present patent application also integrating the means of recycling the gaseous phase.

Other tests were also carried out with a reactor in accordance with FIG. 7, differing from the reactor shown in FIG. 6 by the characteristic according to which the heterogeneous catalyst is not placed inside the reactor in a basket container 4 but in a cartridge 25 placed on recycling loop 21 outside the reactor. A set of valves 26,27, 28 and a diversion 29 are provided so as to permit cartridge change without halting the operation of the reactor. Under normal operation, valves 26 and 28 are closed and valve 27 is open to allow passage of the gaseous phase towards cartridge 25. If it is wished to change the catalyst, valve 27 is closed and valves 26 and 28 are opened enabling the gaseous phase to pass through diversion 29.

These tests led to achieving excellent COR and ammoniated nitrogen reduction.

All the results given above clearly show the numerous advantages related to the use of an effluent treatment according to the process of the invention, in a reactor within which said effluents are subjected to wet air oxidation, in the presence of a heterogeneous catalyst and optionally of a homogeneous catalyst and of at least one oxidising gas such as air or oxygen at a temperature of between approximately 20° C. and approximately 350° C. under a total pressure of between approximately 1 bar and approximately 160 bars. This is in no way a restrictive description of the invention in respect of the type of effluent, the formulation and conditions of use of the catalysts, nor of the conditions of use of the process representing the invention. Finally it will be noted that the process described in the present patent application is compatible with the process of wet air oxidation with internal recycling of solid residues described in French patent application n° 9403503 filed on Mar. 21st 1994 by the applicant.

We claim:

1. A process of aqueous phase oxidation of effluents comprising subjecting said effluents to oxidation in the presence of at least one oxidizing agent inside a reactor in which a gaseous phase is set up above the liquid phase including the effluents, and subjecting said gaseous phase to catalysis in the presence of at least one heterogeneous catalyst, positioned above the interface between the liquid phase and the gaseous phase and spaced inwardly of the walls of the reactor, said process being carried out at a temperature of between approximately 20° C. and approximately 250° C. under a total pressure of between approximately 1 and approximately 160 bars, in such manner as to mineralize at least part of the organic matter and total ammoniated nitrogen contained in said effluents and characterized in that it comprises increasing the contact time between the gaseous phase and the heterogeneous catalyst by recycling at least part of said gaseous phase present in said oxidation reactor after its passage through said heterogeneous catalyst by directing a portion of the gaseous phase from the oxidation reactor and then back into contact with said heterogeneous catalyst in order to obtain substantial removal of $NH_3$, COR and volatile organic compounds.

2. The process of claim 1 wherein said oxidation process is carried out at a temperature lying between approximately 200° C. and 350° C. and under a total pressure of between approximately 20 bars and approximately 160 bars.

3. The process of claim 1 wherein said heterogeneous catalyst includes two or more constituents selected from the group consisting of vanadium, niobium, chromium, molybdenum, tungsten, manganese, iron, cobalt, nickel, copper, cerium, platinum, rhodium, ruthenium, palladium, and iridium, and the mixtures and compounds of one or more of these.

4. The process of claim 1 wherein said heterogeneous catalyst is placed on a mineral support.

5. The process of claim 4 wherein said mineral support is chosen from the group made up of alumna, silica, zealots, titanium dioxide and zirconium.

6. The process of claim 4 wherein said heterogeneous catalyst is in the form of a metallic honeycomb.

7. The process of claim 1 wherein said oxidizing agent includes one or more compounds selected from the group consisting of air, oxygen enriched air, oxygen, ozone, hydrogen peroxide, peracids, gaseous chlorine, chlorine biocide, sodium hypochlorite and potassium permanganate.

8. The process of claim 1 further including a gas moving within said reactor, said gas including one or more compounds selected from the group consisting of air, oxygen enriched air, oxygen, ozone, water or nitrogen steam.

9. The process of claim 1 wherein said aqueous phase oxidation is also carried out in the presence of a homogeneous catalyst intended to increase the efficacy of COR reduction.

10. The process of claim 10 wherein said homogeneous catalyst is a metal selected from the group consisting of manganese, iron, cobalt, nickel, copper, zinc, and the mixtures and compounds of one or more of them.

11. The process of claim 10 wherein said homogeneous catalyst is a soluble compound of copper, zinc, or both.

12. The process of claim 11 wherein said homogeneous catalyst is copper sulfate.

13. The process of claim 10 wherein the mass ratio of catalyst to the chemical requirements of oxygen (COR) of the effluent before treatment lies between 0.0005 and 0.3.

14. The process of claim 1 further including a solid phase mixed in said liquid phase and further including recycling at least a portion of said solid phase through said reactor.

15. The process of claim 1 further including adjusting the pH of said effluents to a value of between 7 to 12 before said oxidation.

16. The process of claim 1 further including heating the area of the reactor proximate said heterogeneous catalyst to a higher temperature than that of the effluent.

17. The process of claim 1 further including heating said heterogeneous catalyst to higher temperature than the temperature of the effluents in said reactor.

18. An oxidation reactor assembly for the treatment of effluents, comprising:
   a. an oxidation reactor having therein a gaseous phase disposed above a liquid phase, said liquid phase including the effluent to be treated; said reactor having a temperature of between approximately 20° C. and approximately 350° C. and a pressure of between approximately 1 and approximately 160 bars;
   b. an inlet connected to said reactor for receiving the effluent to be treated;
   c. a heterogeneous catalyst positioned above the interface between the liquid phase and the gaseous phase and spaced inwardly of the walls of the reactor;
   d. an outlet connected to said reactor for removing at least a portion of the gaseous phase after catalyzation;
   e. a gaseous phase recirculating circuit for recycling at least a portion of the gaseous phase from the reactor and back into contact with the heterogeneous catalyst so as to increase the contact time between the gaseous phase and the heterogeneous catalyst, said gaseous phase recycling circuit including a gaseous phase recycling path that directs the gaseous phase from the reactor and back into the reactor in such a fashion that the gaseous phase is recycled into contact the heterogeneous catalyst.

19. The assembly of claim 18 further including means for recycling at least a portion of said liquid phase back into said reactor.

20. The assembly of claim 18 further including a holder for said heterogeneous catalyst wherein said holder is vertically adjustable for supporting said heterogeneous catalyst above said liquid phase.

21. The assembly of claim 18 further including a heater operative to heat said heterogeneous catalyst above the temperature of said effluent.

22. The assembly of claim 21 wherein said heater is a heating collar disposed outside said reactor.

23. The assembly of claim 18 wherein at least a portion of said liquid phase is recycled back into said reactor and wherein at least a portion of said gaseous phase being recycled is mixed with said liquid phase being recycled.

24. The assembly of claim 23 further including a hydro-ejector and wherein said mixing is via said hydro-ejector.

25. The process of claim 1 wherein the heterogeneous catalyst is disposed above the liquid phase and positioned interiorly of an exterior wall structure that forms a part of the reactor.

* * * * *